United States Patent
Clegg

(10) Patent No.: US 10,738,649 B2
(45) Date of Patent: Aug. 11, 2020

(54) REINFORCED OXIDE-OXIDE CERAMIC MATRIX COMPOSITE (CMC) COMPONENT AND METHOD OF MAKING A REINFORCED OXIDE-OXIDE CMC COMPONENT

(71) Applicant: Rolls-Royce Corporation, Indianapolis, IN (US)

(72) Inventor: Joseph Clegg, Seymour, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 274 days.

(21) Appl. No.: 15/667,995

(22) Filed: Aug. 3, 2017

(65) Prior Publication Data
US 2019/0040760 A1 Feb. 7, 2019

(51) Int. Cl.
*F01D 25/00* (2006.01)
*F01D 25/30* (2006.01)
(Continued)

(52) U.S. Cl.
CPC ............ *F01D 25/005* (2013.01); *B29C 70/30* (2013.01); *B32B 18/00* (2013.01); *D03D 11/00* (2013.01); *F01D 5/282* (2013.01); *F01D 5/284* (2013.01); *F01D 25/30* (2013.01); *F02K 1/48* (2013.01); *F02K 1/82* (2013.01); *C04B 2235/5252* (2013.01); *C04B 2235/5256* (2013.01);
(Continued)

(58) Field of Classification Search
CPC ............ F05D 2300/20; F05D 2300/21; F05D 2300/601; F05D 2300/6012; F05D 2300/603; F05D 2300/6033; F05D 2300/6034; F05D 2250/61; B29C 70/22; B29C 70/222; F01D 25/005; F01D 25/30; F02K 1/48; F02K 1/82; F02K 1/385; F02K 1/386; F01N 2240/20; C04B 2235/5256
USPC ...... 442/178, 205–207, 262; 428/293.4, 293, 428/7, 204.1, 294.4
See application file for complete search history.

(56) References Cited

U.S. PATENT DOCUMENTS 4,487,017 A 12/1984 Rodgers et al.
4,548,034 A 10/1985 Maguire
(Continued)

FOREIGN PATENT DOCUMENTS

GB 2119859 A 11/1983
GB 2160265 A 12/1985

OTHER PUBLICATIONS

BRM (Bally Ribbon Mills), "The Benefits of 3-D Woven Composites," (2017), pp. 1-6, www.ballyribbon.com.
(Continued)

*Primary Examiner* — Todd E Manahan
*Assistant Examiner* — David P. Olynick
(74) *Attorney, Agent, or Firm* — Brinks Gilson & Lione

(57) ABSTRACT

A reinforced oxide-oxide CMC component for a gas turbine engine includes a composite body and a structural element embedded in the composite body, where the composite body comprises a 2D oxide-oxide composite and the structural element comprises a 3D oxide-oxide composite. The 2D oxide-oxide composite includes 2D woven or nonwoven oxide fibers in a first oxide matrix, and the 3D oxide-oxide composite includes 3D woven oxide fibers in a second oxide matrix. The first oxide matrix and the second oxide matrix may comprise the same or a different oxide.

13 Claims, 6 Drawing Sheets

(51) Int. Cl.
  *F02K 1/82* (2006.01)
  *B29C 70/30* (2006.01)
  *F01D 5/28* (2006.01)
  *B32B 18/00* (2006.01)
  *F02K 1/48* (2006.01)
  *D03D 11/00* (2006.01)

(52) U.S. Cl.
  CPC .... *C04B 2235/945* (2013.01); *C04B 2237/38* (2013.01); *F05D 2300/6033* (2013.01)

(56) References Cited

U.S. PATENT DOCUMENTS

| | | | |
|---|---|---|---|
| 4,576,002 A | 3/1986 | Mavrocostas | |
| 5,444,912 A | 8/1995 | Folmer | |
| 6,742,547 B2 | 6/2004 | Bryn et al. | |
| 7,550,107 B2 | 6/2009 | Morrison et al. | |
| 8,293,356 B2* | 10/2012 | Merrill | B32B 18/00 428/156 |
| 9,556,742 B2* | 1/2017 | Parkin | F01D 5/147 |
| 10,240,466 B2* | 3/2019 | Podgorski | B29C 70/48 |
| 10,287,918 B2* | 5/2019 | Quinn | F01D 25/243 |
| 2003/0059577 A1* | 3/2003 | Morrison | C04B 35/645 428/166 |
| 2004/0068981 A1 | 4/2004 | Siefker et al. | |
| 2005/0022921 A1* | 2/2005 | Morrison | C04B 37/005 156/89.11 |
| 2006/0112675 A1 | 6/2006 | Anderson et al. | |
| 2008/0115484 A1* | 5/2008 | Conete | F02K 1/48 60/262 |
| 2010/0056006 A1* | 3/2010 | Campbell | D03D 11/00 442/205 |
| 2010/0293958 A1 | 11/2010 | Girgis et al. | |
| 2011/0036068 A1 | 2/2011 | Lefebvre et al. | |
| 2011/0265447 A1 | 11/2011 | Cunningham | |
| 2014/0241863 A1 | 8/2014 | Tardif | |
| 2014/0260283 A1 | 9/2014 | Bouchard et al. | |
| 2015/0013341 A1 | 1/2015 | Cunningham et al. | |
| 2015/0107225 A1 | 4/2015 | Dindar et al. | |
| 2016/0053619 A1* | 2/2016 | McCaffrey | F01D 5/147 416/229 A |
| 2016/0108746 A1* | 4/2016 | Riehl | B29C 70/22 60/805 |
| 2016/0138457 A1 | 5/2016 | Ilic et al. | |
| 2016/0160690 A1* | 6/2016 | Sokhey | F02K 1/386 415/208.1 |
| 2016/0199262 A1 | 7/2016 | Itzek | |
| 2018/0223693 A1* | 8/2018 | Suciu | F01D 25/30 |

OTHER PUBLICATIONS

Unal, Pelin Gurkan, "3D Woven Fabrics," in *Woven Fabrics*, Han-Yong Jeon (Ed.), InTech, DOI: 10.5772/37492 (2012), pp. 91-120. Available from: https://www.intechopen.com/books/woven-fabrics/3-d-woven-fabrics.

Jackson, Barrett et al., "Oxide-Oxide Ceramic Matrix Composites—Enabling Widespread Industry Adoption," Technical Paper, 3M Advanced Materials Division, St. Paul, MN, 2016, pp. 1-10.

Kiser, D. et al., "Oxide/Oxide Ceramic Matrix Composite (CMC) Exhaust Mixer Development In The NASA Environmentally Responsible Aviation (ERA) Project," ASME Turbo Expo 2015, Jun. 15-19, 2015, Montreal, Canada, pp. 2-27.

McClain, Mike et al., "Rapid Assembly of Fiber Preforms Using 3D Woven Components," Technical Paper, Albany Engineered Composites, Inc., Presented at *Society for the Advancement of Material and Process Engineering 2012 (SAMPE 2012)*, Baltimore, MD; 10 pages.

* cited by examiner

US 10,738,649 B2

REINFORCED OXIDE-OXIDE CERAMIC MATRIX COMPOSITE (CMC) COMPONENT AND METHOD OF MAKING A REINFORCED OXIDE-OXIDE CMC COMPONENT

TECHNICAL FIELD

The present disclosure is directed generally to the fabrication of ceramic matrix composites (CMCs) and more particularly to a method of reinforcing an oxide-oxide CMC.

BACKGROUND

Ceramic matrix composites (CMCs), which include ceramic fibers embedded in a ceramic matrix, exhibit a combination of properties that make them promising candidates for industrial applications that demand excellent thermal and mechanical properties along with low weight, such as gas turbine engine components.

Gas turbine engines include a compressor, combustor and turbine in flow series along a common shaft. Compressed air from the compressor is mixed with fuel in the combustor to generate hot combustion gases that rotate the turbine blades and drive the compressor, and then are released through an exhaust mixing system. Among the various possible applications for CMCs in gas turbine engines are exhaust system components.

BRIEF SUMMARY

A reinforced oxide-oxide CMC component for a gas turbine engine includes a composite body and a structural element embedded in the composite body, where the composite body comprises a 2D oxide-oxide composite and the structural element comprises a 3D oxide-oxide composite. The 2D oxide-oxide composite includes 2D woven or nonwoven oxide fibers in a first oxide matrix, and the 3D oxide-oxide composite includes 3D woven oxide fibers in a second oxide matrix. The first oxide matrix and the second oxide matrix may comprise the same or a different oxide.

A method of making a reinforced oxide-oxide CMC component for a gas turbine engine component comprises: layering a first plurality of plies on a surface of a mandrel to form a first portion of a composite preform, each ply comprising a 2D woven or nonwoven oxide fiber preform impregnated with a first oxide matrix precursor; applying a prepreg structure to a predetermined location on the first portion of the composite preform, the prepreg structure comprising a 3D woven oxide fiber preform impregnated with a second oxide matrix precursor; layering a second plurality of the plies on the surface of the mandrel over the prepreg structure, thereby forming a second portion of the composite preform; and heating the composite preform to a temperature sufficient to sinter the first and second oxide matrix precursors, thereby forming a composite body with at least one structural element embedded therein. The composite body comprises a 2D oxide-oxide composite including 2D woven or nonwoven oxide fibers in a first oxide matrix and the structural element comprises a 3D oxide-oxide composite including 3D woven oxide fibers in a second oxide matrix.

DETAILED DESCRIPTION

Gas turbine engine components fabricated from oxide-oxide CMC composites can provide a weight advantage over conventional superalloy components and offer good high temperature performance and manufacturability. It is challenging, however, to design thin-walled oxide-oxide CMC components, such as exhaust mixers and cones, with sufficient stiffness to maintain the shape of the component during use and prevent fatigue failure. Simply increasing the number of plies during fabrication can improve the stiffness but may lead to an undesirable weight increase. The reinforced oxide-oxide CMC components described herein are designed to offer a significant weight advantage over superalloy components without sacrificing stiffness and fatigue life.

Figure 1:
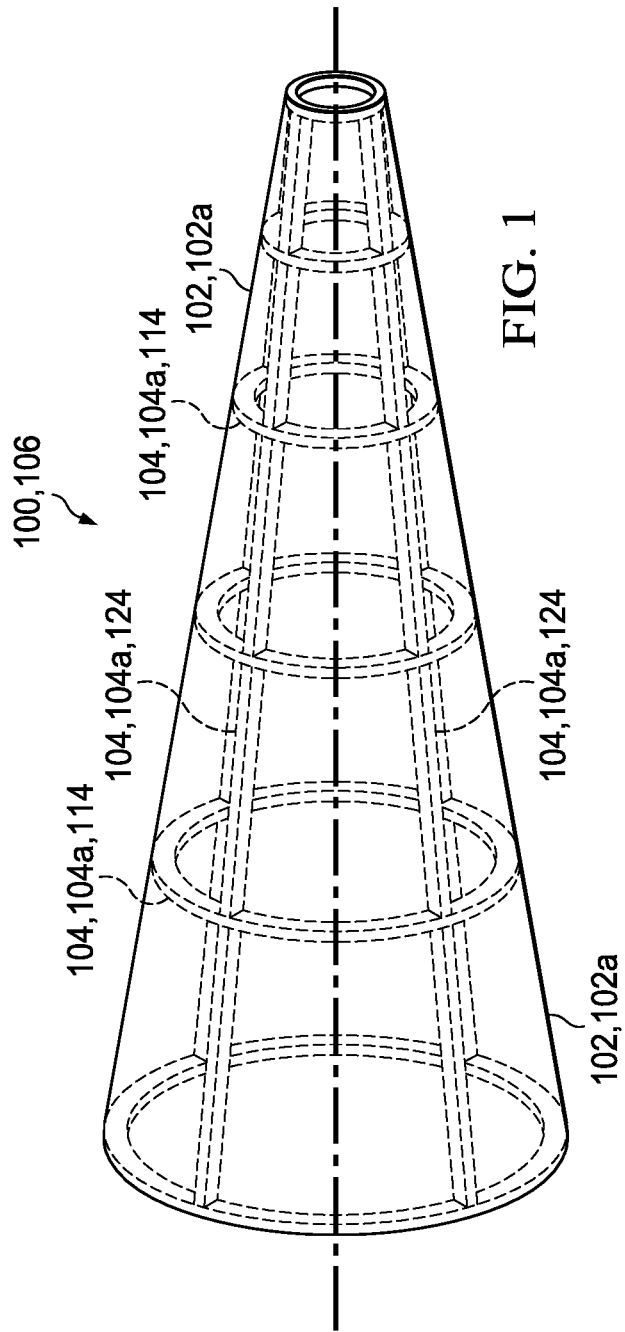
FIG. 1 is a schematic of an exemplary reinforced oxide-oxide CMC component, in particular an exhaust cone for a gas turbine engine.

Referring to FIG. 1, an exemplary reinforced oxide-oxide CMC component 100 includes a composite body 102 with at least one structural element 104 embedded therein, where the composite body 102 comprises a 2D oxide-oxide composite 102a and the structural element 104 comprises a 3D oxide-oxide composite 104a. It is understood that the term "oxide-oxide composite" refers to a composite including oxide fibers in an oxide matrix. The 2D oxide-oxide composite 102a comprises 2D woven or nonwoven oxide fibers in an oxide matrix ("first oxide matrix"), and the 3D oxide-oxide composite 104a comprises 3D woven oxide fibers in an oxide matrix ("second oxide matrix") The first oxide matrix and the second oxide matrix may comprise the same or a different oxide. The oxide fibers of the second oxide-oxide composite 104a are 3D woven into a 3D form, such as a rope, beam, hoop, pyramid, sphere, rectangular prism, cylinder (e.g., bushing) or a more complex geometric form, as discussed below, which defines the shape of the structural element 104. In this example, the reinforced oxide-oxide CMC component 100 is an exhaust cone 106 for a gas turbine engine, and a number of structural elements 104 are employed for reinforcement.

Figure 2A:
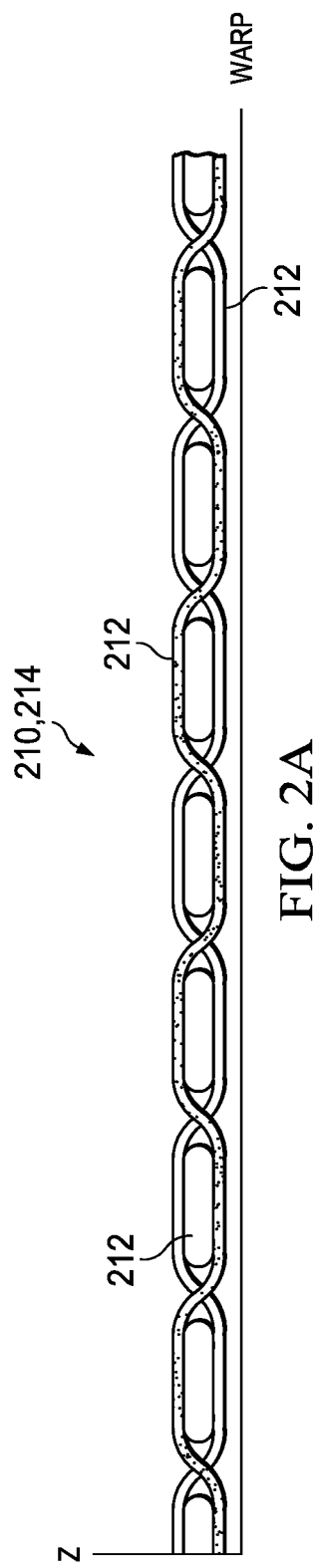
FIG. 2A is a schematic showing 2D woven fibers in a 2D woven fiber preform, where the fibers may be oxide fibers.
Figure 2B:
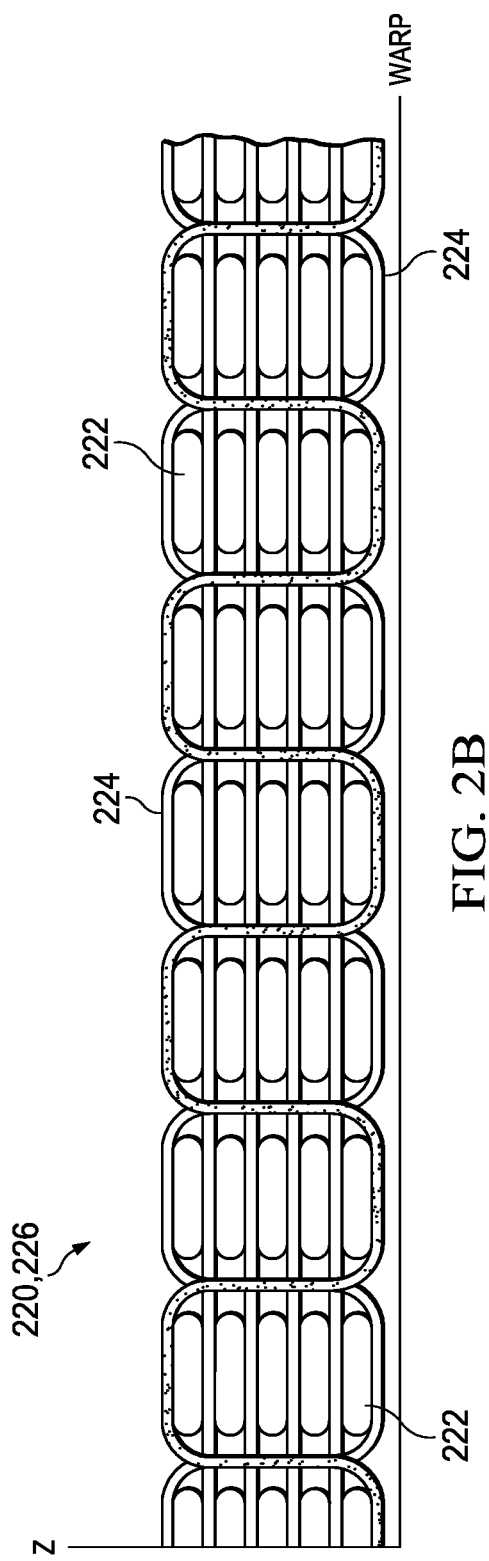
FIG. 2B is a schematic showing 3D woven fibers in a 3D woven fiber preform, where the fibers may be oxide fibers.

The terms "2D woven" and "2D weave" may be used in reference to a conventional weave 210 of (typically) orthogonally-oriented fibers 212 that forms a single layer of interlocking fibers (a "fabric" or "ply" 214), as shown for example in the schematic of FIG. 2A. The fibers 212 in the schematic may be understood to represent the 2D woven oxide fibers described in this disclosure. Although the 2D weave 210 is inherently a three-dimensional structure, the interlocking fibers 212 may be considered to be oriented in a single plane (e.g., along x- and y-directions, or warp and weft directions). Typically, 2D weaves 210 are fabricated from continuous fibers 212, where the fiber length is extremely long compared to the fiber thickness or diameter. The term "nonwoven" may be used to describe a typically random 2D arrangement of fibers held together by a chemical or mechanical bonding agent. Nonwoven fabrics or plies may include entangled chopped (short) and/or continuous oxide fibers. The terms "3D woven" and/or "3D weave" may be used in reference to a multilayer weave 220 including fibers (e.g., continuous fibers) 224 that interlock two or more layers of fabric and thus include a z-direction component to their orientation, as shown for example in the schematic of FIG. 2B. The schematic illustrates an orthogonal fiber architecture. 3D weaving is performed on looms and may involve directing some or all of the warp yarns into the through-thickness direction (or z-direction), while keeping the weft yarns within the plane of the preform to form a simple or complex geometric form. The fibers 222, 224 in the schematics may be understood to represent the 3D woven oxide fibers described in this disclosure. Geometric features such as changes in thickness may be woven directly into the multilayer weave 220, leading to three-dimensional, near-net shape oxide fiber preforms.

The 3D woven oxide fibers may comprise an oxide such as alumina, silica or aluminum silicate. Similarly, the 2D woven or nonwoven oxide fibers may comprise an oxide such as alumina, silica or aluminum silicate. The 2D woven or nonwoven oxide fibers and the 3D woven oxide fibers may comprise the same or a different oxide. In one example, the oxide fibers employed for the first and/or second oxide-oxide composites 102a,104a may be Nextel® ceramic fibers, such as Nextel® 610 ceramic fibers, which comprise alumina.

The first oxide matrix and second oxide matrix may comprise an oxide such as alumina, silica, aluminum silicate, and/or aluminum phosphate. The use of similar oxides or the same oxide throughout the reinforced oxide-oxide CMC composite 100 is preferred to ensure that thermal expansion occurs uniformly at elevated temperatures. Preferably, the structural element 104 has a thermal expansion coefficient within about 10% of a thermal expansion coefficient of the composite body 102, and the thermal expansion coefficients of the structural element 104 and the composite body 102 may be same. This may be the case, for example, if all of the oxide fibers and oxide matrices employed for the reinforced oxide-oxide CMC component 100 comprise the same oxide, such as alumina. Similar thermal expansion coefficients are important to prevent thermally-induced cracking of the reinforced oxide-oxide CMC component 100 during use in a gas turbine engine.

Typically, a number (plurality) of structural elements 104 are embedded in the reinforced oxide-oxide CMC component 100. The composite body 102 may be a thin-walled body having a wall thickness much smaller (e.g., at least an order of magnitude smaller) than a length or width of the body 102, thereby being susceptible to flexural stresses and fatigue failure. In some embodiments, the composite body 102 may have a hollow shape surrounding a longitudinal axis 108. Gas turbine engine components with such a morphology that can benefit from the reinforced oxide-oxide CMC technology described herein include the exhaust cone 106 shown schematically in FIG. 1 and the exhaust mixer 316 shown in FIGS. 3A and 3B. At least one structural element 104,304 may be oriented within the composite body 102,302 along a direction having a circumferential component. Also or alternatively, at least one structural element 104,304 may be oriented within the composite body 102,302 along a direction having a longitudinal component. The position and orientation of the structural element(s) 104,304 within the composite body 102,302 may be determined by considering the flexural stresses to which the reinforced oxide-oxide CMC component 100,300 is exposed during use. Finite element analysis (FEA) methods known in the art may be employed to determine suitable locations for the structural elements 104,304 prior to fabrication of the composite body 102,302.

Figure 4:
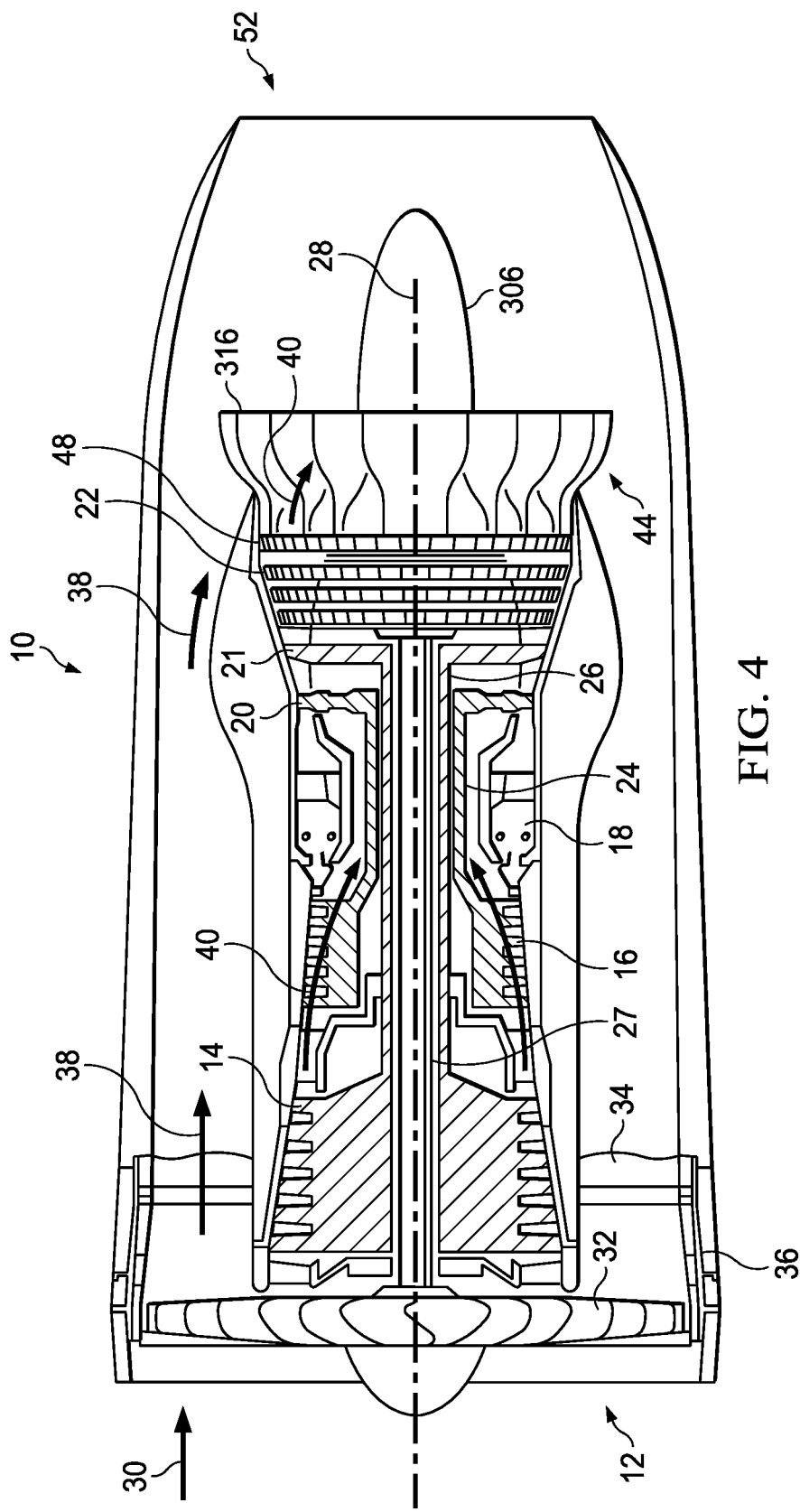
FIG. 4 shows a schematic of an exemplary gas turbine engine.

FIG. 4 illustrates an exemplary gas turbine engine 10 that may include one or more reinforced oxide-oxide CMC components 100, such as the exhaust cone 306 and/or exhaust mixer 316.

The exemplary gas turbine engine 10 includes a fan 12, a low pressure compressor 14 and a high pressure compressor 16, a combustor 18, and high pressure, mid pressure and low pressure turbines 20,21,22. The high pressure compressor 16 is connected to a first rotor shaft 24 while the low pressure compressor 14 is connected to a second rotor shaft 26. The low pressure turbine 22 is connected to another shaft 27. The shafts extend axially and are parallel to a longitudinal center line axis 28. FIG. 4 illustrates a three shaft engine, although two shaft and/or single shaft configurations are also possible. Ambient air 30 enters the fan 12 and is directed across a fan rotor 32 in an annular duct 34, which in part is circumscribed by fan case 36. The bypass airflow 38 provides a large fraction of engine thrust while the primary gas stream (or core airflow) 40 is directed to the combustor 18 and the turbines 20,21,22, and then exhausted through a nozzle, generating thrust.

The engine 10 includes an exhaust mixing system 44. The system 44 may include a multi-lobed mixer 316 comprising the reinforced oxide-oxide CMC technology described herein that can be coupled to an engine interface or support 48 (e.g., rear turbine support). The exhaust mixing system 44 enhances the mixing of the core airflow 40 that passes through the low pressure turbine 22 with the bypass airflow 38 that passes over the multi-lobed mixer 316, which may increase thrust. The mixing of the core airflow 40 and the bypass airflow 38 while each passes over an exhaust cone 306 and exits at exhaust nozzle 52 may also reduce turbine noise. The exhaust cone 306 may also or alternatively comprise the reinforced oxide-oxide CMC technology described herein.

Referring again to the schematic of FIG. 1, which illustrates exemplary locations of the structural elements 104 for the exhaust cone 106, it can be observed that the composite body 102 of this example has a conical shape and may include first structural elements 114 oriented along a direction having a circumferential component and second structural elements 124 oriented along a direction having a longitudinal and radial component. Other positions and orientations of the structural elements 104 are also possible. The structural elements 104 may have the shape of a rod or rope, or another suitable morphology, as discussed above.

Figure 3A:
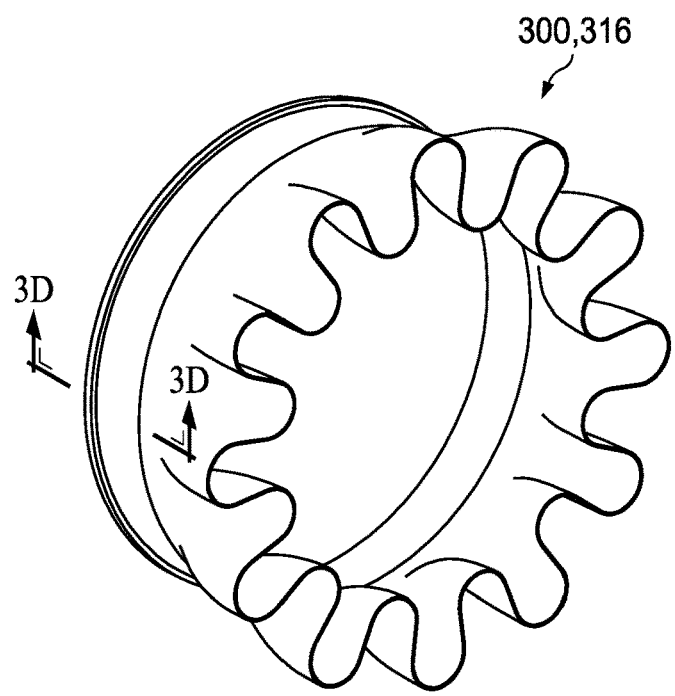
FIG. 3A is a perspective view of an exemplary reinforced oxide-oxide CMC component, in particular an exhaust mixer for a gas turbine engine.
Figure 3B:
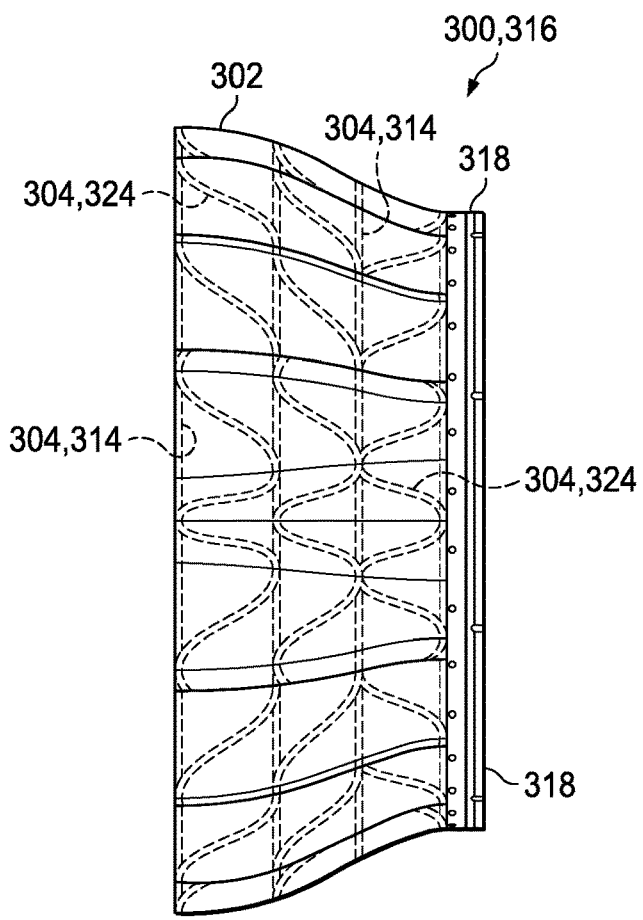
FIG. 3B is a side view of the exhaust mixer of FIG. 3A, where the structural elements embedded in the composite body are illustrated according to one embodiment.
Figure 3C:
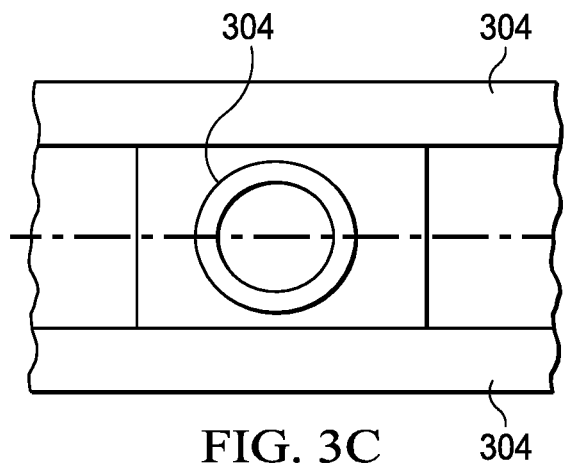
FIGS. 3C and 3D show a top view and side view of an attachment portion of the exhaust mixer of FIGS. 3A and 3B, showing the location and shapes of structural elements, according to one embodiment.
Figure 3D:
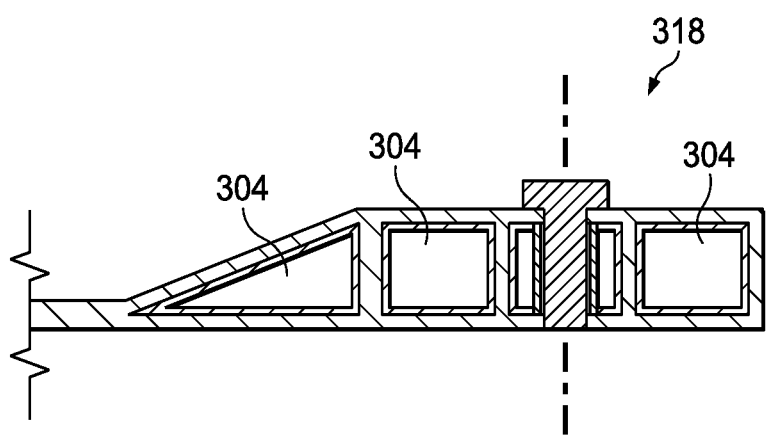

In the example shown in FIGS. 3A and 3B, the reinforced oxide-oxide CMC component 300 is an exhaust mixer 316 for a gas turbine engine. The composite body 302 of this example has a multi-lobed annular shape and may include first structural elements 314 oriented along a direction having a circumferential and radial component and second structural elements 324 oriented along a direction having a longitudinal and radial component, as illustrated in FIG. 3B. Other positions and orientations of the structural elements 304 are also possible. The structural elements 304 provided in the lobes of the exhaust mixer 316 may have the shape of a rod or rope, or another suitable morphology. In addition to multiple lobes, the exhaust mixer 316 may include an attachment portion 318 for coupling to an engine interface or rear turbine support. The attachment portion 318 may also include structural elements 304 for reinforcement. For example, as illustrated in FIGS. 3C and 3D, structural elements 304 having various shapes, including hoops, bushings and pyramids, may be employed.

Figure 5:
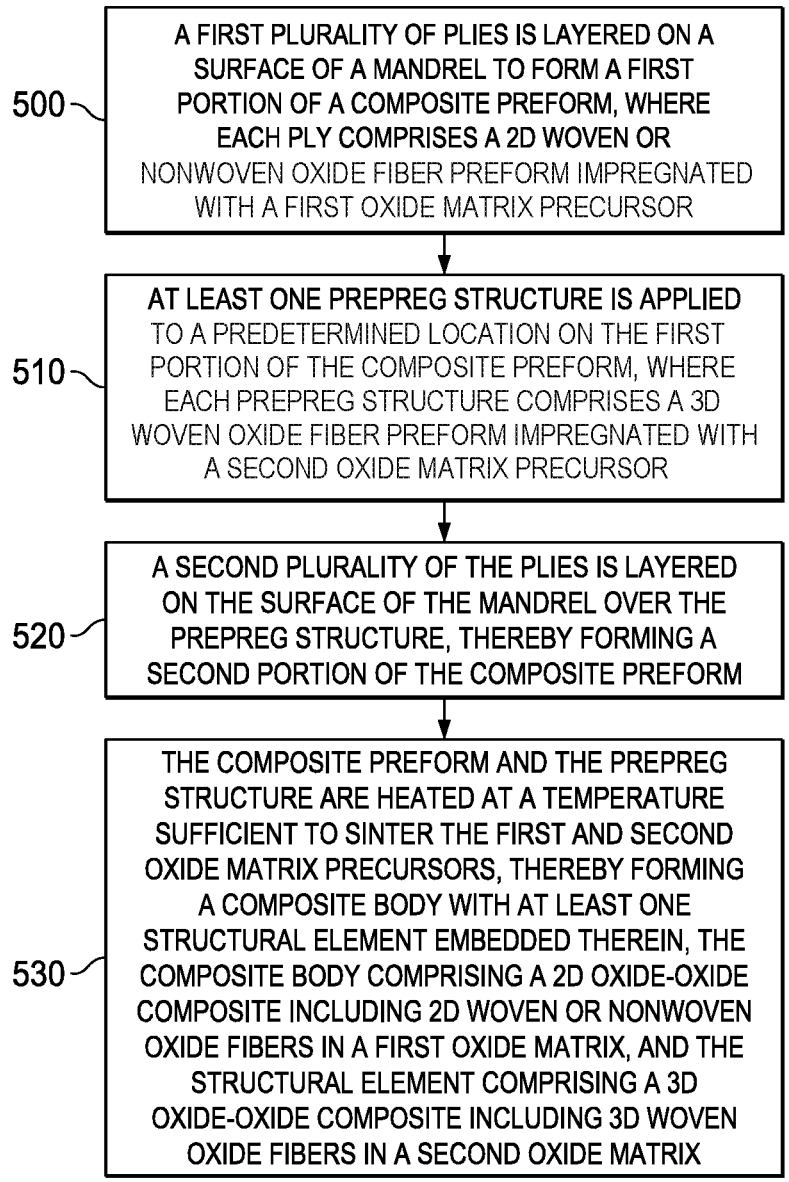
FIG. 5 is a flow chart of a method of fabricating a structurally reinforced oxide-oxide CMC component for a gas turbine engine.

Fabrication of the reinforced oxide-oxide CMC components described herein is now discussed in reference to the flow chart of FIG. 5. A first plurality of plies is layered 500 on a surface of a mandrel to form a first portion of a composite preform, where each ply comprises a 2D woven or nonwoven oxide fiber preform impregnated with a first oxide matrix precursor. The first oxide matrix precursor may comprise, for example, oxide particles applied to the 2D oxide fiber preform as a slurry. The mandrel has a contoured shape that mirrors the desired shape of the reinforced oxide-oxide CMC component being fabricated. At least one prepreg structure is applied 510 to a predetermined location on the first portion of the composite preform, where each prepreg structure comprises a 3D woven oxide fiber preform impregnated with a second oxide matrix precursor. The second oxide matrix precursor may comprise, for example, oxide particles applied to the 3D oxide fiber preform as a slurry. A second plurality of the plies is layered 520 on the surface of the mandrel over the prepreg structure, thereby forming a second portion of the composite preform. The composite preform is heated 530 at a temperature sufficient to sinter the first and second oxide matrix precursors, thereby forming a composite body with at least one structural element embedded therein. Upon sintering, the composite body comprises a 2D oxide-oxide composite including 2D woven or nonwoven oxide fibers in a first oxide matrix, and the structural element comprises a 3D oxide-oxide composite including 3D woven oxide fibers in a second oxide matrix. The temperature for sintering may be in a range from about 900° C. to about 1400° C., and is more typically from about 1000° C. to about 1300° C. As described above, the reinforced oxide-oxide CMC component typically includes a number of the structural elements embedded in predetermined locations in the composite body to improve the thermomechanical properties of the component, which may be an exhaust cone or mixer, or another gas turbine engine component.

As set forth above, the first oxide matrix and the second oxide matrix may comprise the same or a different oxide, such as alumina, silica, aluminum silicate and/or aluminum phosphate. The first oxide matrix precursor and the second oxide matrix precursor used to impregnate the 2D woven or nonwoven oxide fiber preform and the 3D woven oxide fiber preform are sintered to form the first oxide matrix and the second oxide matrix, respectively, as would be recognized by the skilled artisan. Accordingly, the first and second oxide matrix precursors may comprise the same oxide as the first oxide matrix and the second oxide matrix, respectively.

The 2D woven or nonwoven oxide fibers and the 3D woven oxide fibers may comprise an oxide such as alumina, silica, or aluminum silicate, as set forth above. The 2D woven or nonwoven oxide fibers and the 3D woven oxide fibers may comprise the same or a different oxide. As would be recognized by the skilled artisan, the 2D woven or nonwoven oxide fiber preform employed in the method comprises the 2D woven or nonwoven oxide fibers. Similary, the 3D woven oxide fiber preform employed in the method comprises the 3D woven oxide fibers.

The layering of the first plurality of plies on the surface of the mandrel may comprise applying from one to five layers of the plies, and the layering of the second plurality of the plies overlying the prepreg structure may comprise applying from one to five layers of the plies. Due to the incorporation of the prepreg structures, which include the 3D woven oxide fibers and become the structural elements upon sintering and densification, the number of plies employed to fabricate the composite body can be substantially decreased compared to conventional oxide-oxide composite fabrication methods. For example, up to about 10 plies may be employed in the present method, in contrast to about 20 to about 25 plies in conventional fabrication methods.

Typically, the plies have a thickness from about 0.005 in (about 0.13 mm) to about 0.01 in (0.25 mm) per ply, while the prepreg structures and resulting structural elements may have a thickness in a range from about 0.04 in (about 1 mm) to about 0.2 in (about 5 mm) or more depending on the required stiffness. The length and width of the prepreg structures and resulting structural elements may depend on the geometry of the structure (e.g., rod, ring, bushing, etc.). Generally speaking, the length and/or width may range from about 0.1 in (about 2.5 mm) to tens or hundreds of inches (e.g., up to 1 m) or more depending on the required stiffness.

The method may further entail applying a high temperature adhesive to the prepreg structure(s) and/or to the predetermined location(s) in order to adhere the prepreg structures to the first portion of the composite preform, prior to laying up the second plurality of plies. As described above, the predetermined locations at which the prepreg structures are positioned may be determined prior to fabrication using FEA methods known in the art.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A reinforced oxide-oxide CMC component for a gas turbine engine, the reinforced oxide-oxide CMC component comprising:
   a composite body comprising a 2D oxide-oxide composite; and
   first and second structural elements embedded in the composite body, the first and second structural elements comprising a 3D oxide-oxide composite and being completely contained within the composite body, wherein the 2D oxide-oxide composite includes 2D woven or nonwoven oxide fibers in a first oxide matrix, wherein the 3D oxide-oxide composite includes 3D woven oxide fibers in a second oxide matrix, wherein the composite body has a conical shape and includes the first structural elements oriented along a direction having a circumferential component and the second structural elements spaced apart from each other and oriented along a direction having a longitudinal and radial component, and wherein the gas turbine engine component is an exhaust cone.

2. The reinforced oxide-oxide CMC component of claim 1 being an exhaust system component.

3. The reinforced oxide-oxide CMC component of claim 1, wherein the structural element has a shape selected from the group consisting of: a rope, a beam, a hoop, a pyramid, a rectangular prism, and a cylinder.

4. The reinforced oxide-oxide CMC component of claim 1, wherein the composite body has a hollow shape surrounding a longitudinal axis.

5. The reinforced oxide-oxide CMC component of claim 4, wherein the structural element is oriented within the composite body along a direction having a circumferential component.

6. The reinforced oxide-oxide CMC component of claim 4, wherein the structural element is oriented within the composite body along a direction having a longitudinal component.

7. The reinforced oxide-oxide CMC component of claim 1 comprising a plurality of the structural elements.

8. The reinforced oxide-oxide CMC component of claim 1, wherein the 2D woven or nonwoven oxide fibers and the 3D woven fibers comprise an oxide selected from the group consisting of: alumina, silica, and aluminum silicate.

9. The reinforced oxide-oxide CMC component of claim 8, wherein the 2D woven or nonwoven oxide fibers and the 3D woven oxide fibers comprise the same oxide.

10. The reinforced oxide-oxide CMC component of claim 1, wherein the first oxide matrix and the second oxide matrix comprise an oxide selected from the group consisting of: alumina, silica, aluminum silicate, and aluminum phosphate.

11. The reinforced oxide-oxide CMC component of claim 10, wherein the first oxide matrix and the second oxide matrix comprise the same oxide.

12. The reinforced oxide-oxide CMC component of claim 1, wherein the composite body has a first shape and wherein the structural element has a second shape different from the first shape.

13. A reinforced oxide-oxide CMC component for a gas turbine engine, the reinforced oxide-oxide CMC component comprising:

a composite body comprising a 2D oxide-oxide composite; and first and second structural elements embedded in the composite body, and second structural elements comprising, a 3D oxide-oxide composite and being completely contained within the composite body, wherein the 2D oxide-oxide composite includes 2D woven or nonwoven oxide fibers in a first oxide matrix, wherein the 3D oxide-oxide composite includes 3D woven oxide fibers in a second oxide matrix, wherein the composite body has a multi-lobed annular shape and includes the first structural elements oriented along a direction having a circumferential and radial component and the second structural elements oriented along a direction having a longitudinal and radial component, the second structural elements comprising distinct second structural elements, and wherein the gas turbine engine component is an exhaust mixer.

* * * * *